April 27, 1948.  G. F. PETTINOS  2,440,643
SAND BLAST NOZZLE
Filed March 14, 1945
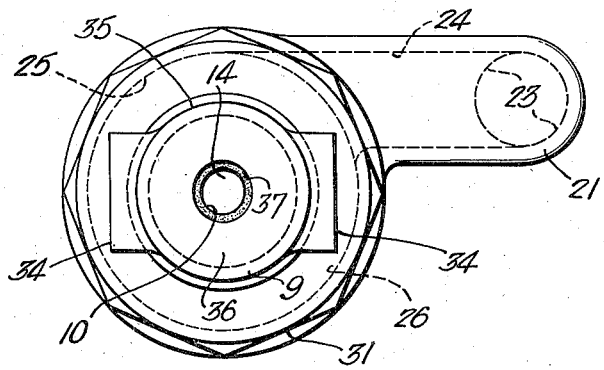
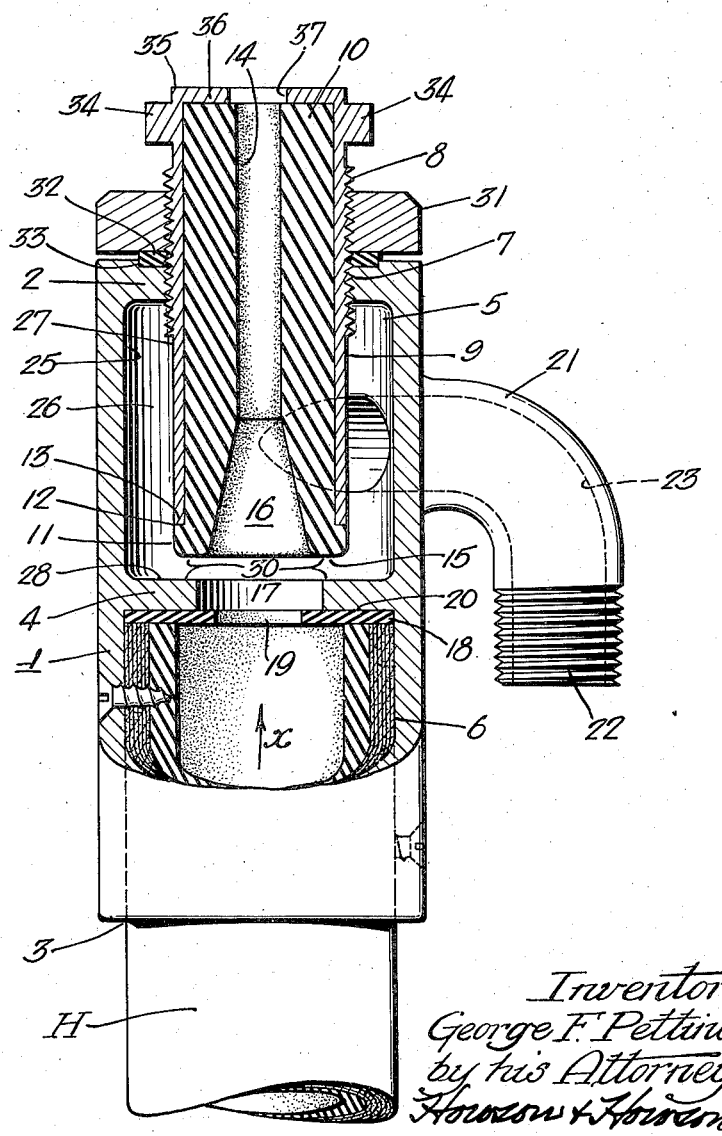
Inventor:
George F. Pettinos
by his Attorneys
Howson & Howson Patented Apr. 27, 1948

2,440,643

UNITED STATES PATENT OFFICE 2,440,643

SANDBLAST NOZZLE

George F. Pettinos, Merion, Pa.

Application March 14, 1945, Serial No. 582,669

7 Claims. (Cl. 51—11)

This invention relates to sand blast nozzles; and the present invention is predicated upon the idea of employing a lining of resilient material having the characteristics of rubber within the discharge orifice of the nozzle, and to provide means for supplying a liquid or aqueous lubricant to the internal wall of the discharge orifice or bore formed in the rubber lining, to prevent, or at least materially reduce and minimize the effects of erosion on the internal wall of the discharge orifice of the nozzle by the sand or other solid abrasive substance suspended in and moving at high velocity with air or other gaseous conveying medium through the bore of the discharge orifice of the nozzle.

The construction of the device and its operation will be more readily understood by reference to the accompanying drawings:

Fig. 1 is a longitudinal sectional view; and

Fig. 2 is an end view.

As shown in the drawing, the nozzle comprises a substantially cylindrical body 1 having an integral head 2, at one end for supporting an adjustable discharge tube forming the nose of the nozzle and being open at its opposite end to receive one end of a hose or other suitable flexible pipe H, through which a mixture of dry sand or other solid abrasive material suspended in air or other gaseous conveying medium is delivered into the interior of the nozzle 1 from any suitable mixing and pressurizing apparatus forming no part of the present invention.

Intermediate the closed end 2 and the open end 3 of nozzle body 1, said body is provided with a transverse partition 4 which divides the body 1 into a substantially closed cylindrical chamber 5 at one end, and an open ended cylindrical recess 6 at the other end for the reception of the hose pipe H.

The head 2 is axially bored and threaded, as indicated at 7, for the reception of external threads 8 formed on the outside of the cylindrical nose tube 9, the inner end of which projects into the chamber 5 to a predetermined distance from the transverse partition 4.

The nose tube 9 is provided with a lining 10 composed of natural or synthetic rubber or equivalent material, and the lining 10 is provided with an annular flange 11 at one end which forms an annular shoulder 12 adapted to bear against the inner end 13 of the nose tube 9, to prevent relative axial movement between the lining and the nose tube in one direction under conditions of use.

The lining 10 is provided with an axial cylindrical bore 14 extending from the outer end of the nose tube 9 to a transverse plane spaced inwardly from the plane of the inner end 13 of said nose tube. The inner end of the axial bore 14 formed in lining 10 flares outwardly from the inner end of the cylindrical bore 14 to the adjacent end surface 15 of the lining 10, in the form of a funnel 16.

The transverse partition 4 is provided with an axial opening 17 of slightly larger diameter than the diameter of the larger end of the funnel 16, for directing sand and air, for example, from the hose pipe H into the flaring mouth of the bore of the lining 10 of the nozzle nose 9 as formed by the funnel 16.

The inner end of the hose pipe H bears against a rubber or other similarly elastic flexible washer 18 having an axial opening 19 aligned with the opening 17 of the partition 4, and which is seated against one surface 20 of the partition 4.

By making the diameter of the axial opening 17 larger than the diameter of the funnel 16 and the opening 19 in the washer 18 as shown, the cylindrical wall surface of the transverse partition 4 which defines the opening 17 is substantially removed from the path of travel of the sand discharged through the opening 19 to the funnel 16. The wall of the opening 17 thus is substantially removed from contact by the sand moving particles and hence erosion and wear of the metal wall of the opening 17 is materially reduced without defeating the advantages and function of the partition 4 in the nozzle body 1.

The body 1 of the nozzle, intermediate the head 2 and partition 4, is provided with an integral elbow or other hollow laterally projecting extension 21 which is externally threaded at its outer end 22 for connecting to a suitable water or other aqueous fluid supply under pressure. The lateral projection 21 is hollow, as indicated at 23, and one side 24 of the wall of the bore of the hollow lateral projection or neck 21 is disposed in tangential relation to the inner circular surface 25 of the wall of the chamber 5, whereby the water or other aqueous lubricant under pressure, in passing into the chamber 5 from the laterally extending neck 21 is caused to move in a circular swirling path about the axis of the nozzle in an annular concentric passage 26 formed between the internal wall surface 25 of the chamber 5 and the outer cylindrical surface 27 of that portion of the cylindrical nozzle nose tube 9 which extends into the chamber 5.

The complementary threads 7 and 8 of the head 2 and nose tube 9 affords axial adjustability for the transverse end surface 15 of the lining 10 of the nose 9 with respect to the adjacent transverse surface 28 of the partition 4, between which a variable annular outlet port 30 is provided for the swirling liquid within the annular passage 26.

In operation, the sand suspended in the air moving in the direction of the arrow $x$ through the hose pipe H passes through the axially aligned orifices 19 and 17 in the washer 18 and partition 4, respectively, and rushes at high velocity across the annular port 30 into the flaring mouth 16 of the bore 14 of the lining 10 of the nozzle nose 9.

The swirling body of liquid forced under pressure from the passage 26 through the annular port 30, moves radially inwardly through the annular port 30 and is carried along with the axially moving current of sand and air, into and through the funnel 16 and cylindrical bore 14 in a swirling layer which retains contact with the internal wall of the funnel 16 and bore 14 as a result of the initial swirling afforded by the liquid entering the chamber 5 at a tangent to the circular wall 25 thereof. Thus, the swirling layer of liquid effects an efficient lubrication of the end surface 15 of the rubber lining 10, the internal wall of the funnel mouth 16, and the cylindrical wall of the bore 14, through which the sand, air and water move concurrently.

The centrifugal force afforded by the liquid lubricant, holds the layer of lubricating liquid in contact with the walls of the funnel 16 and bore 14 and prevents mixing of the liquid with the sand and air. Thus the sand is delivered, in a relatively dry state, against the target at which the stream of air and sand is aimed, for obtaining the highest degree of efficiency. The water, however, which is emitted from the outer end of the bore 14 concurrently with the sand and air develops a moist atmosphere around the area of the target against which the sand and air straim impinges, and thus reduces or eliminates the cloud of the dust around the area of impingement which is common to dry sand blasting.

By adjusting the nozzle nose tube 9 axially with respect to the transverse partition 4, the area of the annular port 30 may be varied to control the amount of water or other liquid passing from the annular passage 26 into contact with the moving current of sand and air entering the funnel 16, whereby the thickness of the wall of lubricating liquid moving in swirling contact with the wall of the funnel 16 and cylindrical bore 14 may be accurately controlled, as well as the amount of liquid discharged with the stream of sand and air from the outer end of the bore 14 of the nozzle against the target, so that an excessive amount of moisture will not be directed against the target, which would decrease the efficiency of the dry sand blasting operation.

The cylindrical nozzle nose tube 9 may be secured in its adjusted position, with respect to the body 1 of the nozzle, by means of a lock nut 31 mounted on the external threads 8 of said nozzle nose tube and which is also adapted to compress a suitable gasket or washer 32 around the threads 8 within a counterbored recess 33 formed in the head 2 to prevent escape of the liquid under pressure from the chamber 5.

For convenience in effecting axial adjustment of the nose 9, said nose may be provided with radial lugs 34, 34 on its outer end 35 or with any other suitable equivalent means for obtaining a firm grip on the nozzle nose 9 to effect turning thereof during adjustment, and to hold said nose while tightening the lock nut 31 to retain such adjustment.

To prevent axial deformation of the lining 10, and to assist in preventing axial displacement thereof in and relative to the nose tube 9, said nose tube is substantially closed at its outer end by a head or end plate 36 which is axially bored at 37 in alignment with the bore 14 of the lining 10.

The device may be used for purposes other than strictly sand blasting, for example, the hollow laterally projecting neck 21 may be connected to a supply of paint, calcimine or other liquid or aqueous coating or cementitious material, under pressure, and the pipe H may supply a stream of air alone, or air with loose free fibrous, flaky or a desirable granular material other than an abrasive suspended therein for coating target surfaces, such as walls, ceilings, etc., without departing from the spirit of the invention. Under such circumstances the nozzle nose may or may not include the rubber lining member 10 and the closure plate 36 on the outer end of the nozzle 9.

I claim:

1. A nozzle structure comprising a body member, a chamber having an internal cylindrical wall within said body member; a nose element axially aligned with said chamber and having an inner end portion projecting into said chamber and an outer end portion extending externally of said body member; a liner of resilient material within and extending substantially from end to end of said nose element and provided with an axial bore for passage and discharge of an abrasive substance suspended in a gaseous conveying medium, said bore having an internal wall engageable by said substance in transit, and means for supplying an aqueous lubricant into said chamber tangentially to said internal cylindrical wall thereof to effect a swirling entrance of said lubricant into the inner end of said bore for covering said internal wall of said bore to minimize erosion thereof by said substance.

2. A nozzle structure comprising a body member, a chamber within said body member and defined by a pair of axially spaced end walls and an intermediate cylindrical side wall, a coaxial nose element having a cylindrical inner end portion projecting into said chamber and including a liner of resilient material having an axial bore for passage and discharge of an abrasive substance suspended in a gaseous conveying medium, the inner end of said nose element being disposed in a transverse plane parallel to and spaced axially from one of said end walls of said chamber and therewith forming an annular fluid port, said bore having a wall terminating adjacent said fluid port and engageable by said substance in transit, and means for supplying an aqueous lubricant tangentially to and against the cylindrical wall of said chamber to effect swirling of said lubricant therein for passage through said port into the inner end of said bore for covering said engageable wall thereof to minimize erosion of said engageable wall by said substance.

3. A nozzle structure comprising a body member, a chamber within said body member and defined by a pair of axially spaced end walls and an intermediate cylindrical side wall, a coaxial nose element having a cylindrical inner end portion projecting into said chamber and including a liner of resilient material having an axial bore for passage and discharge of an abrasive substance suspended in a gaseous conveying medium, the inner end of said nose element being disposed in a transverse plane parallel to and spaced axially from one of said end walls of said chamber and therewith forming an annular fluid port, said bore having a wall terminating adjacent said fluid port and engageable by said substance in transit, means for supplying an aqueous lubricant tangentially to and against the cylindrical wall of said chamber to effect swirling of said lubricant therein for passage through said port into the inner end of said bore for covering said engageable wall thereof to minimize erosion of said engageable wall by said substance, and means for adjusting said nose element axially to vary the effective area of said port.

4. A nozzle structure comprising a body member, a cylindrical walled chamber within said body member, an axially bored transverse wall at one end of said chamber, a cylindrical nose element axially aligned with said chamber and having an inner end portion projecting into said chamber to a position adjacent said transverse wall to form an annular port therebetween, an outer end portion of said element extending externally of said body member, said nose element being provided with an axial bore extending from said inner end to said outer end thereof for passage therethrough and discharge from said outer end thereof of one fluid adapted to enter the inner end of said bore from the axial bore in said transverse wall, and means for supplying another fluid into said chamber tangentially to the cylindrical wall thereof to effect a swirling entrance of said other fluid into the inner end of said bore through said annular port for discharge from said outer end of said bore with said one fluid.

5. A nozzle structure comprising a body member, a cylindrical walled chamber within said body member, an axially bored transverse wall at one end of said chamber, a cylindrical nose element axially aligned with said chamber and having an inner end portion projecting into said chamber to a position adjacent said transverse wall to form an annular port therebetween, an outer end portion of said element extending externally of said body member, said nose element being provided with an axial bore extending from said inner end to said outer end thereof for passage therethrough and discharge from said outer end thereof of one fluid adapted to enter the inner end of said bore from the axial bore in said transverse wall, means for supplying another fluid into said chamber tangentially to the cylindrical wall thereof to effect a swirling entrance of said other fluid into the inner end of said bore through said annular port for discharge from said outer end of said bore with said one fluid, and means for effecting relative axial movement between said nose element and said transverse wall for governing the effective area of said port.

6. In a nozzle structure comprising a nozzle body and a nose element therein, a lining of resilient material in said element having an internal bore provided with an entrance mouth for passage and discharge of a mixture of an abrasive substance and air, an opening for said mixture in the nozzle body having a bore larger than the entrance mouth of the bore and said lining, said opening being disposed in axial alignment with and spaced from said entrance mouth, means for adjusting the spaced relationship of said entrance mouth with respect to said opening, and means for supplying an aqueous lubricant to the lining bore at the entrance mouth thereof for coating the lining to minimize erosion thereof by said abrasive substance.

7. A nozzle structure comprising a body member, a chamber having an internal cylindrical wall within said body member, a nose element extending inwardly of said chamber axially thereof, a liner of resilient material within and extending substantially the length of said nose element and provided with an axial bore for passage and discharge of an abrasive substance suspended in a gaseous conveying medium, and means for supplying an aqueous lubricant into said chamber tangentially of the internal cylindrical wall thereof to effect a swirling entrance of said lubricant into said axial bore and cover the wall of the bore to minimize erosion thereof by said abrasive substance.

GEORGE F. PETTINOS.

REFERENCES CITED

The following references are of record in the file of this patent:

UNITED STATES PATENTS

| Number | Name | Date |
|---|---|---|
| 984,254 | Akeley | Feb. 14, 1911 |
| 992,144 | Babcock | May 16, 1911 |
| 1,073,149 | Lawrence | Sept. 16, 1913 |
| 2,107,084 | Pletcher | Feb. 1, 1938 |
| 2,325,517 | Howard | July 27, 1943 |
| 2,369,576 | Keefer | Feb. 13, 1945 |
| 2,376,616 | Oechsle et al. | May 22, 1945 |
| 2,405,854 | Ruemelin | Aug. 13, 1946 |

FOREIGN PATENTS

| Number | Country | Date |
|---|---|---|
| 192,600 | Germany | Nov. 29, 1907 |